INVENTOR.
JOHN A. GAYLORD

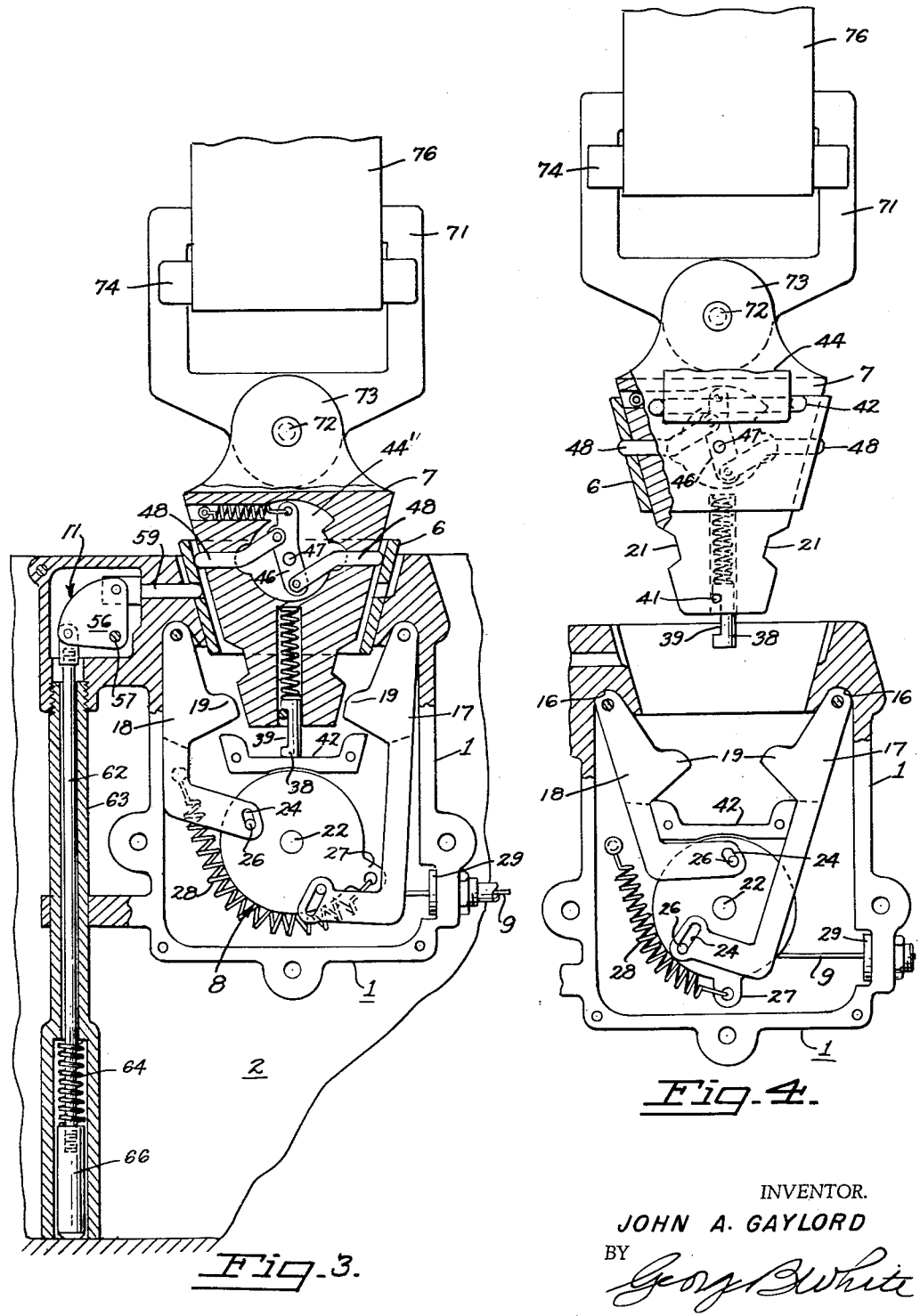

2,994,552
RELEASABLE SUSPENSION LOCK FOR AERIAL SURVIVAL KITS AND THE LIKE

John A. Gaylord, San Rafael, Calif., assignor to H. Koch & Sons, Corte Madera, Calif., a partnership
Filed Aug. 12, 1957, Ser. No. 677,690
10 Claims. (Cl. 294—83)

This invention relates to a releasable suspension lock for aerial survival kits and the like.

The usual survival kits for aircraft personnel include the necessities for survival in the event of parachuting out of the aircraft. Such necessities are held together in a single package or kit and usually are hung by means of a strap hanging either from the parachute harness or from the garment of the person. Usually such survival kits are so made that they fit on the seat of the person in the aircraft and therefore can be ejected from the aircraft with the person and are suspended in the air by said straps.

One of the important problems in connection with the attaching of such survival kits to the person is the provision of suitable connection from the suspending strap to the kit in the form of a lock which when locked in position must be shockproof at any angle and which will not spring open or release accidentally under shocks and vibrations under any circumstances but which can be quickly detached at will by the person also within the aircraft so as to permit the person to rise from his seat without lifting the kit.

The primary object of the invention is to provide such a connection and locking means for such hanging strap that the connection is positively locked to the survival kit and cannot be accidentally disengaged under vibration or shock of any degree or direction until the lock is positively disengaged at will by a releasing mechanism.

A further object of the invention is to provide a combination lock for a hanging strap connection and a kit suspending lanyard which can be selectively operated to release the hanging strap connection separately or to carry with it the end of the lanyard on which latter in turn the survival kit is suspended below the person parachuting out of an aircraft; means being provided to normally hold the connection between the strap lock and the lanyard connection disengaged while the survival kit rests on its support so as to permit the separate release of the strap lock when the person desires to stand up without raising or lifting the survival kit.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

FIG. 3 is another sectional view showing the control mechanism for the lock in released position while the survival kit is on the seat of the person so as to permit separation of the strap lock without pulling out the lanyard attachment.

FIG. 4 is a partly sectional development view showing both the strap lock and the lanyard attachment in the released position withdrawn from the casing of the survival kit.

FIG. 5 is top plan view of the lanyard attachment.

FIG. 6 is a perspective view of the lanyard attachment sleeve, and

FIG. 7 is a side view of the lanyard attachment showing the lanyard connection to the same.

Figure 1:
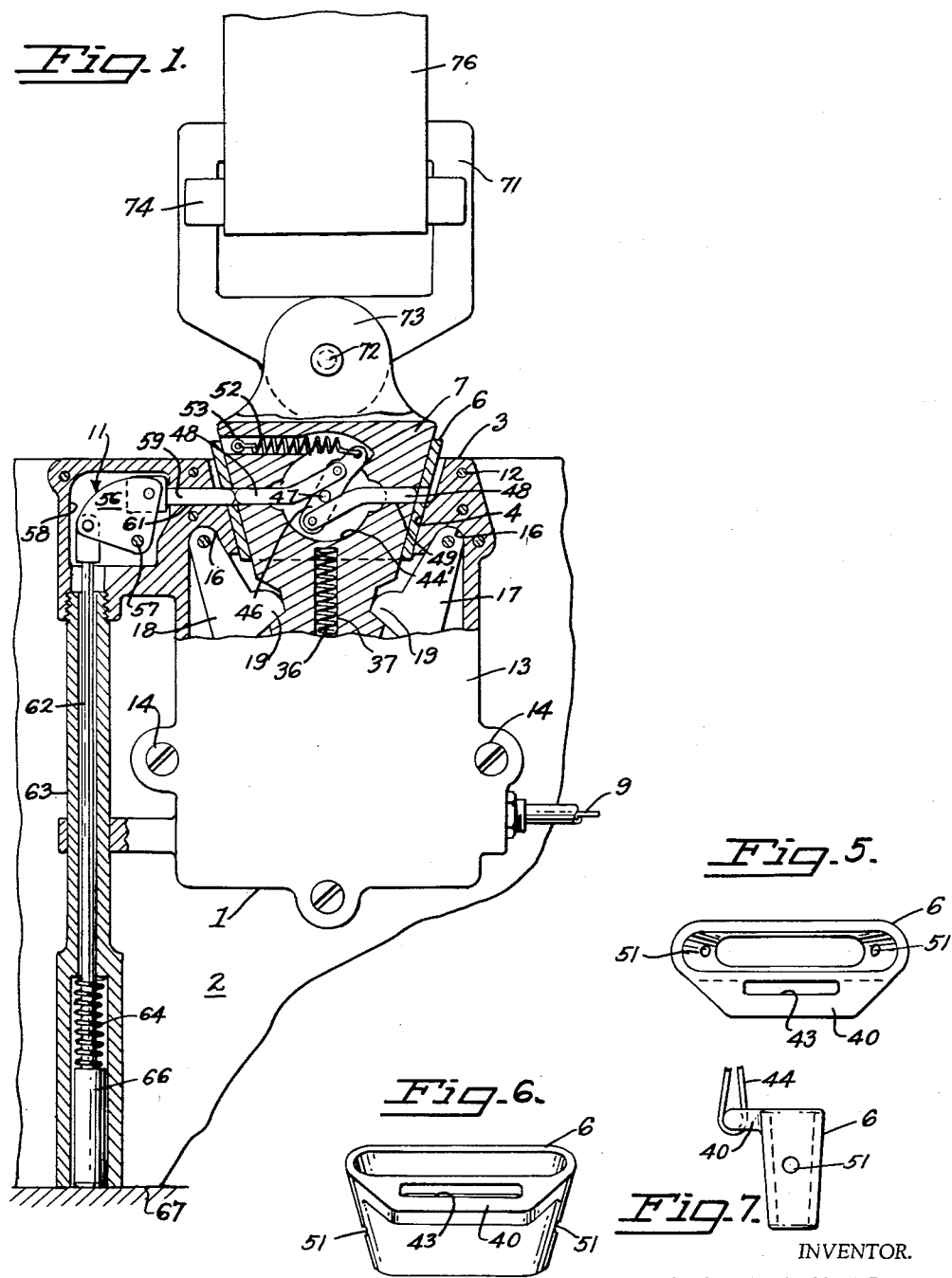
FIG. 1 is a partly sectional view of a strap connection lock and combined lanyard lock mechanism shown on a fragment of the casing of the survival kit.

The side lock for such strap attachment includes a housing 1 which is secured to one side of the casing 2 of the survival kit. The top 3 of this housing 1 has therein a generally frusto-conical elongated socket 4 into which fits an elongated generally frusto-conical lanyard attachment sleeve 6. Into this frusto-conical lanyard attachment sleeve 6 fits a generally frusto-conical flat plug 7. A device 8 inside of the housing 1 functions to lock the plug 7 normally and to release the plug 7 whenever a line 9 is suitably manipulated. Also on the housing 1 is a suitable sleeve locking mechanism 11 adapted to disengage the lanyard sleeve 6 from the plug 7 whenever the survival kit casing 2 is resting on the seat below the person and to automatically cause rigid connection between the lanyard sleeve 4 and the plug 7 whenever the survival casing 2 is lifted up or raised from the seat of the person.

In detail, a housing 1 is fastened by suitable screws 12 or the like to each side of the casing 2 and has a cover 13 secured thereover by suitable screws 14 particularly as shown in FIG. 1. Under the top 3 of the housing 1 and under the opposite ends of the elongated socket 4 are provided journal sockets 16 to accommodate the respective pivoted ends of opposite jaws 17 and 18. Each of the jaws 17 and 18 has thereon a tooth or dog 19 for engagement with the adjacent notch or recess 21 on the adjacent inclined edge of the plug 7 below the socket 4.

Figure 2:
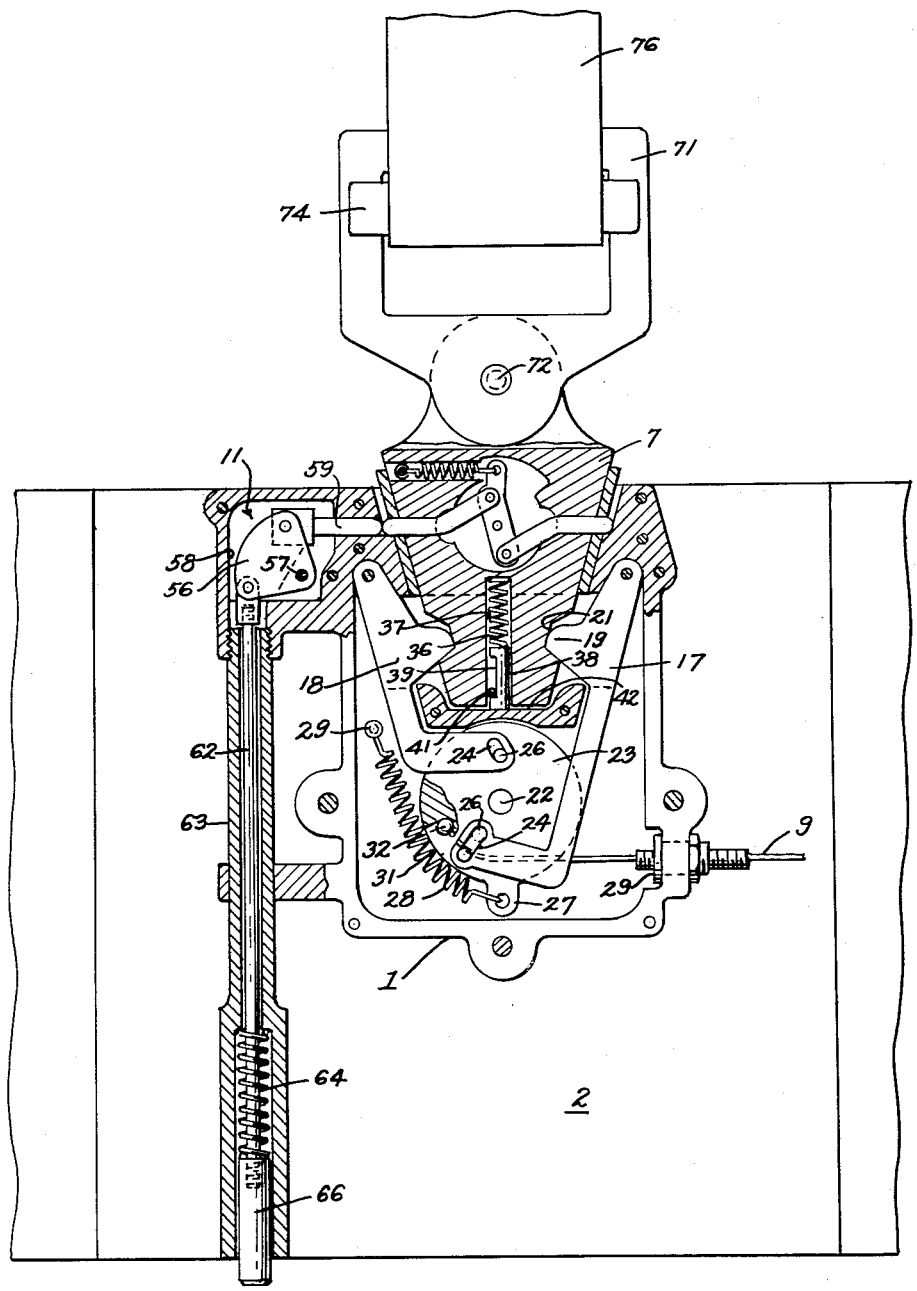
FIG. 2 is a sectional view of the strap lock and the lanyard carrier in connected position after the survival kit is raised from the seat and as it is initially suspended below the person.

The lower ends of the jaws 17 and 18 are bent at an angle so as to extend respectively below and above the center pivot shaft 22 of an operating disc 23. The inner end of the bent end of each jaw 17 or 18 has an elongated pivot slot 24 therein which slots 24 engage pins 26 respectively extended from the face of the pivoted disc 23 so that as the disc 23 is turned in a clockwise direction viewing FIG. 2, then the respective jaws 17 and 18 are pulled into plug locking position and when the disc 23 is turned in a contra-clockwise direction as shown in FIG. 3, then the jaws 17 and 18 are swung away from the plug 7 so that the dogs 19 thereof are disengaged from the recesses 21 of the plug 7 and allow the release of the latter. An ear 27 projects from the periphery of the disc 23. A coil spring 28 is anchored at one end thereof to the ear 27 and at its other end to an anchor pin 29 on the wall of the housing 1 so as to normally pull the ear and the disc 23 in a clockwise direction viewing FIG. 2 so as to hold the jaws 17 and 18 in plug locking position, as shown in FIG. 2.

The operating or manipulating line 9 extends through a suitable terminal bushing 29 on the vertical sidewall of the housing 1. The inner end of the line 9 extends through a groove 31 in the lower portion of the periphery of the disc 23. This groove 31 turns upwardly and terminates at a transverse pin 32 to which the end of the line 9 is secured. The pin 26 of the lower jaw 17 extends across the slot 31 and to the outside of the adjacent line 9 so as to aid in holding the line 9 in the groove 31. When a pull is exerted on the line 9, it will turn the disc 23 in a contra-clockwise direction viewing FIG. 2, namely to the position shown in FIG. 3. The line 9 is pulled by suitable handle mechanism on the survival kit, not shown herein.

In order to accelerate the ejection of the plug 7 from the housing socket 4 I provide a coil spring 36 in a socket 37 in the bottom portion of the plug 7. This coil spring 36 bears against a sliding plug 38 slidable in the socket 37. On one side of this sliding plug 38 is a recess 39 which slides over a limit pin 41 fixed transversely across the socket 37 so as to limit the movement of the sliding plug 38 into and out of socket 37 and to hold the sliding plug 38 within the said socket 37 when the plug 7 is ejected and separated from the housing 1, as shown in FIG. 4. The sliding plug 38 bears against a fixed abutment 42 suitably fixed in the casing above the disc 23 and between the jaws 17 and 18 at such a distance as to locate the plug 7 in proper position when inserted into the housing 1. In this position the spring 36 is compressed so that when the jaws 17 and 18 are moved apart to release the plug 7, then the action of the coil spring 36 will materially accelerate ejection of the plug 7 from the housing 1 and its positive instantaneous detachment from the survival kit.

The lanyard sleeve 6 is an elongated frusto-conical sleeve, as shown in FIGS. 5, 6 and 7 and has near its upper end a side flange 40 with a slot 43 therein for engagement by a usual lanyard 44, as shown in FIG. 4. The other end of the lanyard 44 is connected to the top of the survival kit so that upon the detachment of the plug 7 and the sleeve 6 from the survival kit, the kit will hang on the lanyard 44.

In order to positively hold the sleeve 6 upon the plug 7, there is provided in the body of the plug 7 a central pocket 44'. In the pocket 44' there is lever 46 pivoted on a pivot pin 47 the pivot pin being transverse to the plug 7 and the lever 46 being generally parallel with the plane of the flat plug 7. A pair of bent bolts 48 are respectively pivoted above and below the pivot 47 and extend through lateral holes 49 in opposite directions through the respective sides of the plug 7. The lanyard sleeve 6 has opposite holes 51 in its narrow ends into which the ends of the respective bolts 48 extend so as to positively lock together the sleeve 6 and the plug 7. A coil spring 52 anchored in a hole 53 in the top of the plug 7 generally at right angles to the lever 46, is also anchored in an extension on the lever 46 above the upper bolt 48 so as to normally pull the lever 46 in a contra-clockwise direction viewing FIG. 2, and thereby normally to urge the bolts 48 into the respective keeper holes 49 in the lanyard sleeve 6. The frusto-conical socket 4 has a pair of opposite grooves 45 in its upper portion to accommodate the tips of the bolts 48 projecting through the holes 49 and thus further locate the plug 7.

The control mechanism 11 for the interlocking of the plug 7 and lanyard sleeve 6 includes a crank plate 56 journalled on a pivot 57 in an extension pocket 58 along a side of the housing 1. In the upper corner of the crank plate 56 is pivoted a plunger 59 which extends through a guide hole 61 in alignment with the adjacent keeper hole 49 in the sleeve 6, and opposite the end of the adjacent bolt 48. From the lower corner of the crank plate 58 extends a pivoted rod 62 through a guide 63 which is screwed into the bottom of the socket 58 generally at right angles to the plunger 59. The lower end of the guide 63 is enlarged so as to accommodate a tension spring 64 around the lower portion of the rod 62 and bearing against a head 66 on the bottom end of the rod 62.

The bottom end of the enlarged head 66 of the guide 63 is generally level with the bottom 67 of the survival kit casing 2, when the head 66 is pushed into the enlarged portion of the guide 63 and compresses the spring 64. In this position the rod 62 is moved upwardly to rock the crank plate 56 in clockwise direction viewing FIG. 2, thereby pushing the plunger 59 against the end of the adjacent bolt 48 so as to push that bolt 48 out of the adjacent keeper hole 49 of the sleeve 6 and to replace the bolt 48 in said keeper hole 49. The movement of the bolt 43 rocks the lever 46 against the action of the spring 52 so that it withdraws the other bolt 48 from its keeper hole 49 and thereby keeps plug 7 separated from the lanyard sleeve 6 as long as the rod 62 is in its upward position. Consequently if the person wants to leave his seat without carrying his survival kit with him, he merely pulls the line 9 to release and eject the plug 7, but the lanyard sleeve 6 remains in the housing 1. When the person is seated again, he pushes the plug 7 into the lanyard sleeve 6 so as to lock the plug 7 again in the housing 1.

When the person parachutes from the plane, the survival kit casing 2 hangs on the usual strap with the bottom freed from the seat. As a result the spring 64 pushes the rod 62 downwardly, rocks the crank plate 56 in a contra clockwise direction viewing FIG. 2 and pulls the plunger 59 out of the lanyard sleeve 6. By the action of the coil spring 52 the bolts 48 are entering the keeper holes 49 in the lanyard sleeve 6. Thus the plug 7 and the lanyard sleeve 6 are securely locked together. As the person pulls the line 9 in the air, then the plug 7 and the lanyard sleeve 6 are ejected together and the kit 2 is suspended from the lanyard 44 for its suitable position and operation.

The connection of the plug 7 to the hanging strap may be accomplished in any suitable manner. In the present illustration a clasp hook 71 is secured by a transverse pivot 72 to a disc-like circular head 73 on the top of the plug 7. A transverse bar 74 extends across the loop 71 so that the strap 76 can be played around the respective bar 74 and through the top of the loop 71 so as to be locked in position. The strap 76, as heretofore stated, hangs from the parachute harness or from the garment of the person in the aircraft.

In operation the person using the knit attaches the hanging strap 76 to the loop 71 of the plug 7. He places the survival kit casing 2 upon the seat which pushes the rod 62 upward so as to operate the mechanism 11 for pushing the plunger 59 into the keeper hole 49 of the lanyard sleeve 6 thereby holding the sleeve 6 locked to the housing 1. The lanyard 44 is connected to the lanyard sleeve 6 during the usual assembly of these devices on the opposite sides of the survival kit casing 2. When the operator takes his seat, he plugs the plug 7 into the respective housings 1 until the dogs 19 of the jaws 17 and 18 engage the respective recesses 21 and lock the plug 7 to the housing 1. In the event the operator wishes to rise without lifting the survival kit, he pulls the line 9 through a suitable device, not shown, so as to turn the disc 23 in a contra-clockwise direction viewing FIG. 2 and thereby to move the jaws 17 and 18 apart and release the plug 7 and thereupon pulls the plugs 7 out of the lanyard sleeves 6 and the person is free to rise from his seat leaving the survival kit in the seat. In the event of the ejection or escape of the person from the aircraft, the plugs 7 are securely locked in position so that they cannot be jerked out of the casing 1 and thus the survival kit hangs on the straps 76 from the person while he is in the air. Due to the automatic operation of the mechanism 11 by the spring 64 the plug 7 is automatically locked together with the lanyard sleeve 6. When the person reaches the altitude at which the survival kit is to be dropped so as to hang at a predetermined distance beneath the person, then the flexible line 9 is pulled again, as heretofore described, to release the plug 7 and the sleeve 6 together. The plug 7 is rapidly ejected by the spring 36 together with the lanyard sleeve 6 thereby allowing the survival kit to drop beneath the person to the distance determined by the length of the lanyard 44 and securely hang from the same because the lanyard sleeve 6 is positively locked to the plug 7.

This device is usually utilized in pairs, one on each side of the survival kit casing 2 and it is positive in operation. It is shockproof and cannot disengage accidentally, operates positively and only in response to manipulation and thereby assures ease of operation and the required high degree of safety which is needed for the survival of aircraft personnel.

I claim:

1. A releasable connection for suspending means for aerial survival kits, comprising a housing secured to the survival kit, a socket in the top of the housing, a plug extended through said socket and being connectable to a suspending element, a holder sleeve fitting between the plug and the socket being connectable to another suspending element, means to connect said sleeve to said plug, releasable locking means for locking the plug inside the housing, and manipulable means for releasing said locking means to allow the escape of the plug and said sleeve from said housing at will, and means to release the connecting means between said plug and said sleeve and simultaneously connect said sleeve to said housing for the pulling of the plug out of said sleeve.

2. In a strap connection for hanging a survival kit, a housing adapted to be secured to the kit, a socket extended through a side of the housing, a lanyard holder sleeve removably fitting into said socket and being connectable to a lanyard of the survival kit, a stray holder plug insertable through said sleeve in the housing and being connectable to a suspension element, releasable connecting means between said plug and said sleeve normally to secure the same together, releasable locking means in the housing engaging said plug to lock the plug in said housing, manipulable means to release said locking means at will for releasing said plug and sleeve from said housing, means supported on said housing for releasing said connecting means between said plug and said sleeve for freeing said plug from said sleeve while said sleeve is held in place in said housing, an element on said last releasing means for operating said last releasing means whenever the kit is resting on a support surface, and yieldable means to automatically actuate said element when the kit is freed from said surface for withdrawing said last releasing means from said connecting means and for interlocking said plug and said sleeve.

3. In a releasable suspending device for a survival kit, a housing adapted to be attached to the kit, an aperture through a wall of the housing, a sleeve fitting into said aperture and being connectable to the lanyard of said survival kit, a plug fitting into said sleeve and being connectable to a suspending element, interlocking elements to interlock said plug and sleeve together, yieldable means normally urging said interlocking elements into sleeve locking position for holding the sleeve securely together with said plug, a sleeve releasing mechanism supported with said housing including a member for moving said interlocking elements into inoperative position and for simultaneously locking the sleeve to the housing so as to free said plug from said sleeve, resilient means normally to hold said member withdrawn from said sleeve, an abutment element for abutting the surface on which the kit is rested for automatically moving said member against the force of said resilient means into operative position for engaging said sleeve and for freeing said sleeve from said plug when the kit is resting on said surface, and manipulable means in said housing normally holding said plug in said housing and being releasable from said plug at will.

4. In a suspending device for a survival kit, a plug attachable to a suspending line, a sleeve on the plug connectable to a lanyard of said kit, a housing having an aperture through a wall thereof into which said sleeve fits, a locking device in the housing normally for locking said plug to said housing, means to manipulate said locking device at will for releasing the plug, withdrawable means for locking said plug and sleeve together, a withdrawing device adjacent the housing for withdrawing said withdrawable means for freeing the plug from said sleeve and for simultaneously securing said sleeve to said housing, an abutment element of said withdrawing device abutting a surface on which the kit rests and operating said withdrawing device to secure said sleeve and free said plug from said sleeve, and means coacting with said abutment element to operate said withdrawing device when said abutment element is lifted from said surface to free said sleeve from said housing, and means to return said withdrawable means into locking position automatically when said withdrawing device frees said sleeve from said housing.

5. In a suspending device for a survival kit, a plug attachable to a suspending line, a sleeve on the plug connectable to a lanyard of said kit, a housing having an aperture through a wall thereto into which said sleeve fits, a locking device in the housing normally for locking said plug to said housing, means to manipulate said locking device at will for releasing the plug, withdrawable means for locking said plug and sleeve together, a withdrawing device adjacent the housing for withdrawing said withdrawable means for freeing the plug from said sleeve and for simultaneously securing said sleeve to said housing, an abutment element of said withdrawing device abutting a surface on which the kit rests and operating said withdrawing device to secure said sleeve and free said plug from said sleeve, means coacting with said abutment element to operate said withdrawing device when said abutment element is lifted from said surface to free said sleeve from said housing, and means to return said withdrawable means into locking position automatically when said withdrawing device frees said sleeve from said housing, said withdrawable locking means including a lever pivoted in said plug, a pair of bolts extended in opposite directions from said lever on opposite sides of said pivot, said plug having apertures through opposite sides thereof through which said bolts extend, said sleeve having keeper apertures therein to be engaged by the respective bolts, and said returning means including resilient means normally urging said lever about its pivot so as to extend said bolts into said keeper apertures of said sleeve for locking said plug and sleeve together.

6. In a suspending device for a survival kit, a plug attachable to a suspending line, a sleeve on the plug connectable to a lanyard of said kit, a housing having an aperture through a wall thereof into which said sleeve fits, a locking device in the housing normally for locking said plug to said housing, means to manipulate said locking device at will for releasing the plug, withdrawable means for locking said plug and sleeve together, a withdrawing device adjacent the housing for withdrawing said withdrawable means for freeing the plug from said sleeve and for simultaneously securing said sleeve to said housing, an abutment element of said withdrawing device abutting a surface on which the kit rests and operating said withdrawing device to secure said sleeve and free said plug from said sleeve, means coacting with said abutment element to operate said withdrawing device when said abutment element is lifted from said surface to free said sleeve from said housing, and means to return said withdrawable means into locking position automatcially when said withdrawing device frees said sleeve from said housing, said withdrawable locking means including a lever pivoted in said plug, a pair of bolts extended in opposite directions from said lever on opposite sides of said pivot, said plug having apertures through opposite sides thereof through which said bolts extend, said sleeve having keeper apertures therein to be engaged by the respective bolts, and said returning means including resilient means normally urging said lever about its pivot so as to extend said bolts into said keeper apertures of said sleeve for locking said plug and sleeve together, and said withdrawing device including a releasing bolt element, a guide passage on the housing accommodating said bolt element and aligning it with one of said keeper apertures in said sleeve, a mechanism for pushing said bolt element into said aligned keeper aperture and pushing the respective bolt out of the keeper aperture and taking its place thereby freeing said sleeve from said plug and locking said sleeve into said aperture and to said housing.

7. In a suspending device for a survival kit, a plug attachable to a suspending line, a sleeve on the plug connectable to a lanyard of said kit, a housing having an aperture through a wall thereof into which said sleeve fits, a locking device in the housing normally for locking said plug to said housing, means to manipulate said locking device at will for releasing the plug, withdrawable means for locking said plug and sleeve together, a withdrawing device adjacent the housing for withdrawing said withdrawable means for freeing the plug from said sleeve and for simultaneously securing said sleeve to said housing, an abutment element of said withdrawing device abutting a surface on which the kit rests and operating said withdrawing device to secure said sleeve and free said plug from said sleeve, said withdrawing device including a releasing bolt element engageable with said withdrawable means and with said sleeve, a guide on the housing guiding said bolt element to said withdrawable means for withdrawing said withdrawable means from said sleeve when said bolt element is moved to said sleeve for locking said sleeve to said housing, a resiliently urged mechanism for moving said bolt element to said withdrawable means and to said sleeve, said abutment element abutting the surface on which the kit rests to be pushed thereby for shifting said mechanism to move and hold said bolt element into engagement with said sleeve when said kit rests on said surface.

8. In a releasable connection for suspending means for aerial survival kits, a housing on the aerial kit, socket means formed through a wall of the housing, and a plug extended through said socket means into said housing, said plug being connectable to a suspending strap; releasable locking means for locking the plug inside the housing, manipulable means for releasing said locking means to free the plug from said housing at will, said manipulable means including opposite keeper recesses on said plug, a pair of jaws, engagement members on said jaws engaging said keeper recesses, a disc pivoted in said housing, the ends of said jaws being pivoted on said disc on opposite sides of the center and moving in opposite directions as the disc is turned, resilient means to urge said disc normally to draw said jaws together, and a manipulating line connected to said disc for pulling said disc against the action of said spring moving said jaws apart and disengaging them from the plug.

9. In a releasable connection for suspending means for aerial survival kits, a housing on the aerial kit, socket means formed through a wall of the housing, and a plug extended through said socket means into said housing, said plug being connectable to a suspending strap; releasable locking means for locking the plug inside the housing, manipulable means for releasing said locking means to free the plug from said housing at will, said manipulable means including opposite keeper recesses on said plug, a pair of jaws, engagement members on said jaws engaging said keeper recesses, a disc pivoted in said housing, the ends of said jaws being pivoted on said disc on opposite sides of the center and moving in opposite directions as the disc is turned, resilient means to urge said disc normally to draw said jaws together, and a manipulating line connected to said disc for pulling said disc against the action of said spring moving said jaws apart and disengaging them from the plug, a stationary abutment in the housing, and a spring ejector in the bottom of said plug bearing against said stationary abutment and against said plug and accelerating the ejection of said plug from said housing.

10. In a releasable connection for suspending means for aerial survival kits, a housing on the aerial kit, socket means formed through a wall of the housing, and a plug extended through said socket means into said housing, said plug being connectable to a suspending strap; releasable locking means for locking the plug inside the housing, manipulable means for releasing said locking means to free the plug from said housing at will, said manipulable means including opposite keeper recesses on said plug, a pair of jaws, engagement members on said jaws engaging said keeper recesses, a disc pivoted in said housing, the ends of said jaws being pivoted on said disc on opposite sides of the center and moving in opposite directions as the disc is turned, resilient means to urge said disc normally to draw said jaws together, and a manipulating line connected to said disc for pulling said disc against the action of said spring moving said jaws apart and disengaging them from the plug, a stationary abutment in the housing, and a spring ejector in the bottom of said plug bearing against said stationary abutment and against said plug and accelerating the ejection of said plug from said housing, said spring ejector including a hole in the bottom of said plug, a slidable element in the hole, means to limit the stroke of movement of said slidable element in said hole, and a spring between the bottom of the hole and said slidable element, said slidable element retaining said spring in said hole.

References Cited in the file of this patent

UNITED STATES PATENTS

| 1,141,437 | Unterlender | June 1, 1915 |
| 2,478,019 | Sonntag | Aug. 2, 1949 |

FOREIGN PATENTS

| 1,414 of 1913 | Great Britain | Jan. 8, 1914 |